United States Patent [19]

Heshmat

[11] 4,296,976
[45] Oct. 27, 1981

[54] CROSS-PLIES SUPPORT ELEMENT FOR COMPLIANT BEARINGS

[75] Inventor: Hooshang Heshmat, Schenectady, N.Y.

[73] Assignee: Mechanical Technology Incorporated, Latham, N.Y.

[21] Appl. No.: 136,958

[22] Filed: Apr. 3, 1980

[51] Int. Cl.³ .............................................. F16C 32/06
[52] U.S. Cl. ........................................ 308/9; 308/73; 308/160; 308/DIG. 1
[58] Field of Search ................ 308/9, 3 R, DIG. 1, 308/121, 122, 168, 163, 164, 170, 237 R, 26, 73, 238, 35, 160

[56] References Cited

U.S. PATENT DOCUMENTS

| | | | |
|---|---|---|---|
| 1,494,010 | 5/1924 | Newhouse | 308/160 |
| 1,684,693 | 9/1928 | Bohm | 308/160 |
| 3,215,479 | 11/1965 | Silver et al. | 308/121 |
| 3,215,480 | 11/1965 | Marley | 308/DIG. 1 |
| 3,298,751 | 1/1967 | Elwell | 308/9 |
| 3,366,427 | 1/1968 | Silver et al. | 308/122 |
| 3,375,046 | 3/1968 | Marley | 308/164 |
| 3,382,014 | 5/1968 | Marley | 308/9 |
| 3,434,761 | 3/1969 | Marley | 308/9 |
| 3,434,762 | 3/1969 | Marley | 308/9 |
| 3,467,451 | 9/1969 | Marley | 308/122 X |
| 3,495,886 | 2/1970 | Roberts et al. | 308/163 |
| 3,504,953 | 4/1970 | Love | 308/9 X |
| 3,506,314 | 4/1970 | Gross et al. | 308/9 |
| 3,511,544 | 5/1970 | Marley | 308/3 R |
| 3,520,578 | 7/1970 | Licht | 308/9 |
| 3,542,440 | 11/1970 | Brand et al. | 308/9 |
| 3,552,815 | 1/1971 | Keller | 308/238 |
| 3,615,121 | 10/1971 | Barnett et al. | 308/9 |
| 3,635,534 | 1/1972 | Barnett | 308/121 |
| 3,642,331 | 2/1972 | Silver | 308/35 |
| 3,677,612 | 7/1972 | Barnett et al. | 308/9 |
| 3,747,997 | 7/1973 | Winn | 308/9 |
| 3,750,249 | 8/1973 | Brandon et al. | 308/237 R X |
| 3,795,427 | 3/1974 | Licht et al. | 308/9 |
| 3,806,209 | 4/1974 | Laing et al. | 308/9 |
| 3,809,443 | 5/1974 | Cherubim | 308/9 |
| 3,884,534 | 5/1975 | Winn | 308/9 |
| 3,893,733 | 7/1975 | Silver et al. | 308/9 |
| 3,951,474 | 4/1976 | Hughes et al. | 308/9 |
| 3,957,317 | 5/1976 | Silver | 308/9 |
| 4,005,914 | 2/1977 | Newman | 308/9 |
| 4,082,375 | 4/1978 | Fortmann | 308/160 X |
| 4,116,503 | 9/1978 | Licht | 308/9 |
| 4,118,079 | 10/1978 | Newman et al. | 308/9 |
| 4,133,585 | 1/1979 | Licht | 308/9 |
| 4,167,295 | 9/1979 | Glaser | 308/9 |
| 4,170,389 | 10/1979 | Eshel | 308/9 |
| 4,208,076 | 6/1980 | Grey | 308/9 |
| 4,222,618 | 9/1980 | Miller, Jr. | 308/9 |
| 4,223,958 | 9/1980 | Grey | 308/9 |
| 4,227,756 | 10/1980 | Bhustan | 308/DIG. 1 |
| 4,262,975 | 4/1981 | Heshmat et al. | 308/9 |

OTHER PUBLICATIONS

Applying Resilient Foil Air Bearings to Turbomachinery by S. Gray, Society of Automotive Engineers, Nov. 11, 1975.

*Primary Examiner*—Stuart S. Levy
*Attorney, Agent, or Firm*—Joseph V. Claeys; John M. Neary

[57] ABSTRACT

A resilient support element for a compliant hydrodynamic fluid film bearing has top and bottom corrugated foil modules separated by a thin mid-plane sheet. Both modules are split by slits extending perpendicular to their corrugation axes, and the two modules are arranged with their corrugations extending transverse to each other. The angular stiffness of each finite area of the support element is substantially equal about orthogonal axes over its entire area. The support element provides superior damping and soft, strong isotropic support of the bearing sheet for generation of high load capacity at low speed, stable operation and high load capacity at high speed, and tolerance of manufacturing, use and loading abberations.

10 Claims, 8 Drawing Figures

U.S. Patent   Oct. 27, 1981   Sheet 1 of 8   4,296,976
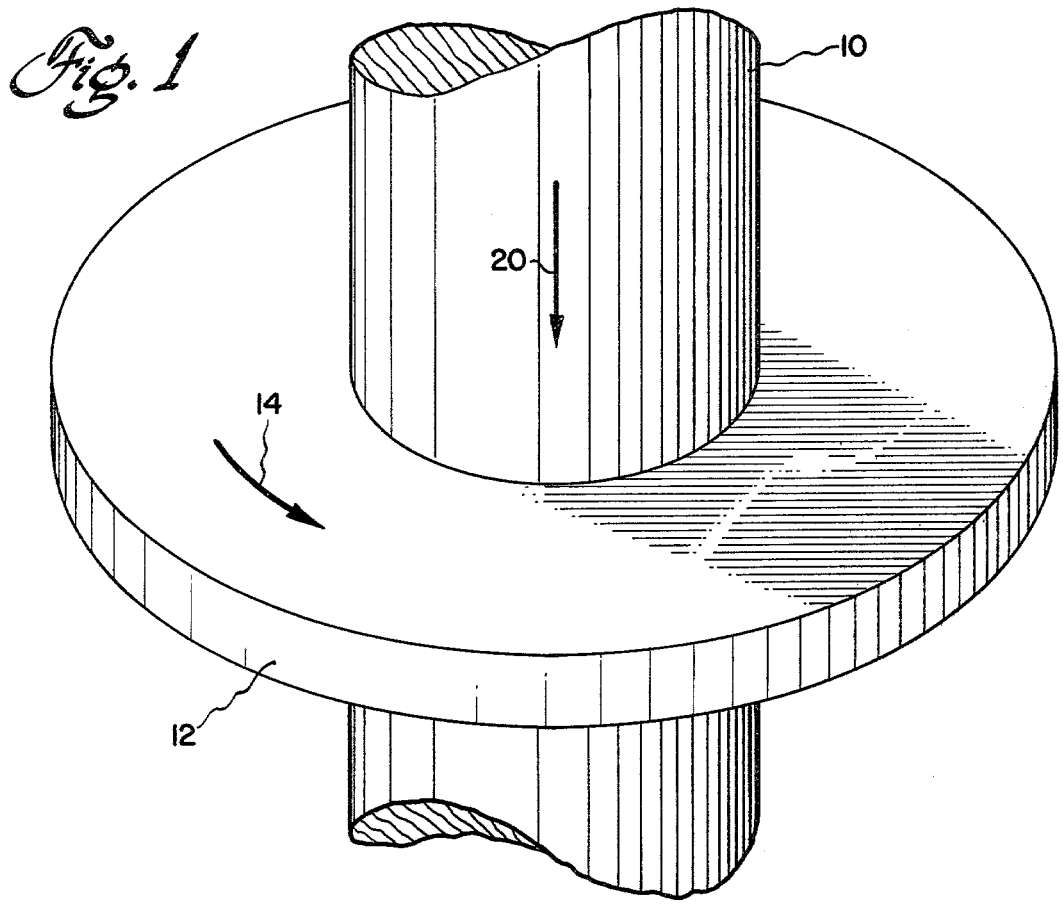
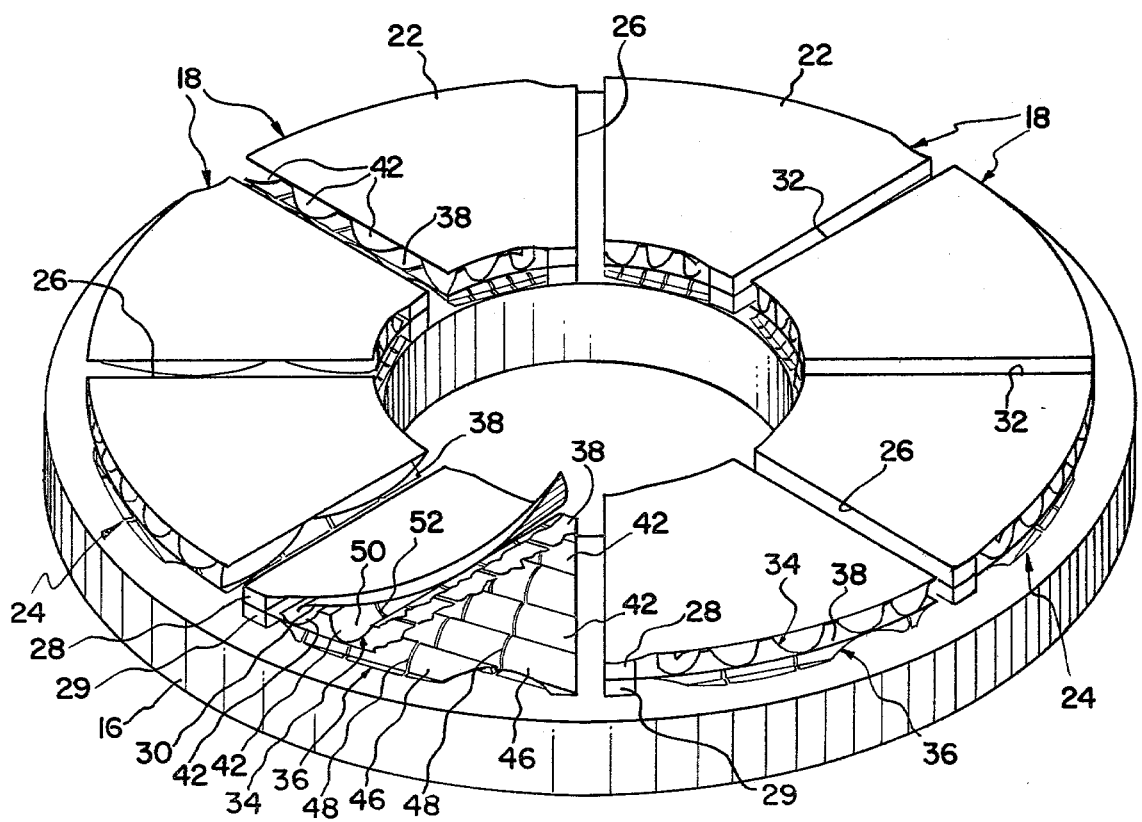

CROSS-PLIES SUPPORT ELEMENT FOR COMPLIANT BEARINGS

BACKGROUND OF THE INVENTION

This invention relates to compliant fluid-film bearings, and more particularly to a resilient support element for supporting a flexible bearing sheet in a compliant hydrodynamic fluid-film bearing.

Recent developments in the field of compliant hydrodynamic gas bearings have dramatically improved the load carrying capacity and stability of these bearings so that they are becoming increasingly attractive for use in a wide variety of ordinary high-speed bearing applications. In the past, these bearings have been used primarily in ultra-high-speed and hostile environment applications in which conventional bearings were completely unsuitable. Although these compliant hydrodynamic gas bearings performed adequately under their design conditions, they did not always have a good tolerance for shock, misalignment, or radical departures from the design load conditions. Therefore, these bearings have not found wide application in ordinary commercial and industrial products primarily because of the lack of control over the use of these products and the consequent wide variety of abuse situations to which they can be subjected.

Recent improvements in compliant hydrodynamic gas bearings are changing this situation. These improvements greatly increase the range of conditions under which these bearings can operate reliably so that they are now more suitable for use in ordinary industrial and consumer products.

To make the hydrodynamic compliant gas bearing realize its potential and gain widespread acceptance for the ordinary industrial and consumer products market, I believe certain improvements in the structure of the bearing would be desirable. One such improvement is manufacturability. The bearing must be manufacturable in large quantities with few, if any, rejects. Rejects, or inoperative bearings, have not been uncommon in the past. This situation has been tolerated because the bearings were for special-purpose, high-technology products that were manufactured in small quantities, so each bearing could be tested prior to assembly in the machine. Therefore, a high proportion of rejects affected the total cost of the product relatively insignificantly. As a high-volume manufactured product, however, this situation would be intolerable because of the need to protect each bearing would increase the cost of the bearing so much that it would not be competitive with conventional bearings despite its functional advantages.

The other essential improvement that must be made in compliant hydrodynamic fluid-film bearings before they can be accepted commercially is the broadening of the range of conditions under which they operate reliably. These conditions relate primarily to misalignment, thermal distortion, and shock tolerance; adequate load capacity at low speed as well as high speed; and bearing stability under all conditions of loading. The improvements made recently in these bearings have dramatically improved the range, but further improvements in the maximum load capacity and in the tolerance to normally encountered use and manufacturing aberations will accelerate the commercial acceptance of these bearings.

SUMMARY OF THE INVENTION

It is thus an object of this invention to provide a compliant hydrodynamic fluid-film bearing which is economically manufacturable with inherently good quality control and which is reliable in operation over a wide range of operating conditions.

These objects are achieved in a compliant hydrodynamic fluid-film bearing having a bearing sheet supported on a bearing mounting member and supported thereon by a support element having a split corrugated foil module overlying a second split corrugated foil module in which the corrugations on the two modules are perpendicular to each other and the slits in each module run perpendicular to the axis of the corrugations.

Because the spring zones represented by the stacked bumps are in series, the foil elements can be made of a thicker gauge foil which has a high stress capacity without producing an unduly stiff support member. The resulting soft support member is thus capable of generating high load capacity at low speed. With the incorporation of my invention disclosed and claimed in the application Ser. No. 136,957 entitled "Multi-Stage Support Element for Compliant Bearing" filed concurrently herewith, the support element can also provide high stiffness to the bearing at high-load and high-speed operation when high stiffness is desirable. Finally, this support element provides an equal degree of angular stiffness across the bearing sheet in the orthogonal directions parallel to and perpendicular to the direction of motion of the rotating surface on the rotor, and independence of deflection of each zone of the support element relative to the other zones so that the bearing sheet can deflect under all forms of eccentric loading such as shock, bearing misalignment, thermal distortion of the rotor surface, and rotor and load eccentricities. The bearing sheet can thus remain at its optimal position with respect to the rotor bearing surface and thereby continue carrying the load exerted by the rotor and distributing the internally generated heat uniformly across the bearing sheet to prevent thermal distortion of the bearing elements and maintain steady operation despite these fluctuating conditions of operation.

DESCRIPTION OF THE DRAWINGS

The invention and its many attendant advantages and objects will become better understood upon reading the following detailed description of the preferred embodiment in conjunction with the following drawings, wherein:

FIG. 1 is a perspective view of a thrust bearing made in accordance with this invention;

DESCRIPTION OF THE PREFERRED EMBODIMENTS

Figure 2:
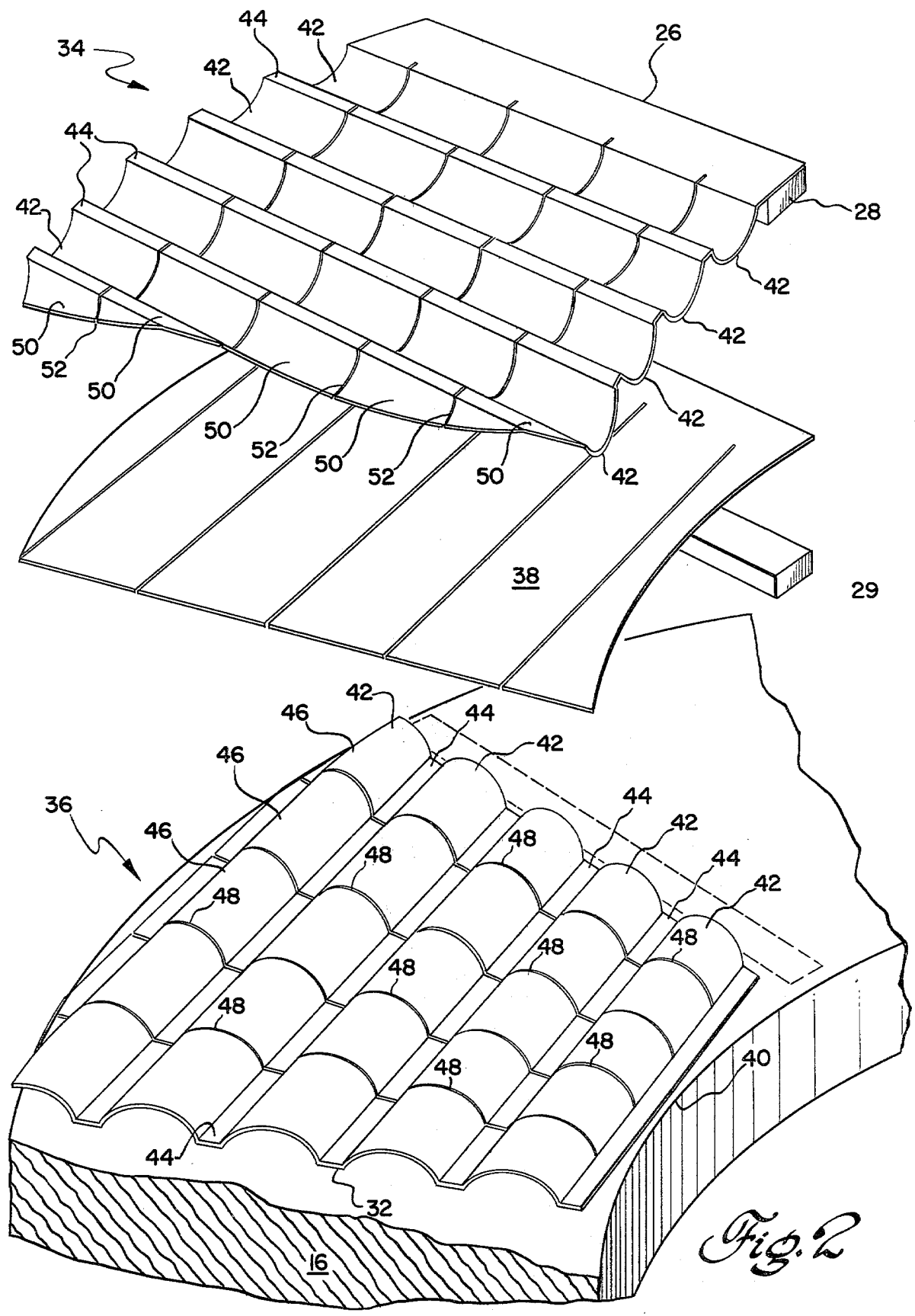
FIG. 2 is an exploded perspective view of one of the bearing pads shown in FIG. 1.

Referring now to the drawings, wherein like reference characters designate identical or corresponding parts, and more particularly to FIG. 1 thereof, a thrust bearing is shown having a rotating shaft 10 carrying a thrust runner 12 rotating in the direction shown by the arrow 14 and supported by a stationary thrust plate 16 on which are mounted a plurality of bearing pads 18. The bearing pads 18 support the rotating thrust runner 12 to support the axial load of the shaft indicated by the arrow 20.

Each thrust pad 18 includes a bearing sheet 22 supported on a resilient compliant support element 24 which in turn is mounted on the thrust plate 16. The support element 24 and the bearing sheet are both fastened to the thrust plate 16 at the leading edge 26 of each pad in the sense of the direction 16 of rotation of the thrust runner 12. The structure of the support element 24 is shown partially in FIG. 1 and more completely in FIGS. 2 and 3.

Each bearing sheet 22 is secured at the leading edge 26 of the pad indirectly to the thrust plate 16 along a radial line.

Between the bearing sheet and the thrust plate are a pair of spacer blocks 28 and 29 and the leading edges of some support element foils. The leading edge of the bearing sheet 22 is raised by the spacer blocks 28 and 29 by an amount less than the total height of the support element, thereby creating an inclined wedge for the supported bearing sheet 22. A supporting hydrodynamic fluid-film cushion is generated over the inclined bearing sheet by the rotation of the overlying thrust runner in a manner described in my co-pending application Ser. No. 80,503 entitled "Stepped, Split, Cantilevered Compliant Bearing Support" filed on Oct. 1, 1979, the disclosure of which is incorporated herein by reference.

A split stiffener sheet 30 is attached to each bearing sheet 22 at the trailing edge 32 of each pad. The stiffener sheet stiffens the trailing edge of the bearing pad to reduce the tendancy of the support element at the trailing edge of the pad to collapse under the extremely high vertical loads and the moment created by the cantilever support of the bearing sheet 22 at its leading edge. The stiffener sheet 30 spreads this high load over the trailing half of the support element to prevent undue deflection of the support element at its trailing edge, and facilitates the creation of a crown-shaped profile which is conducive to the generation of an optimum hydrodynamic supporting fluid film.

Figure 3:
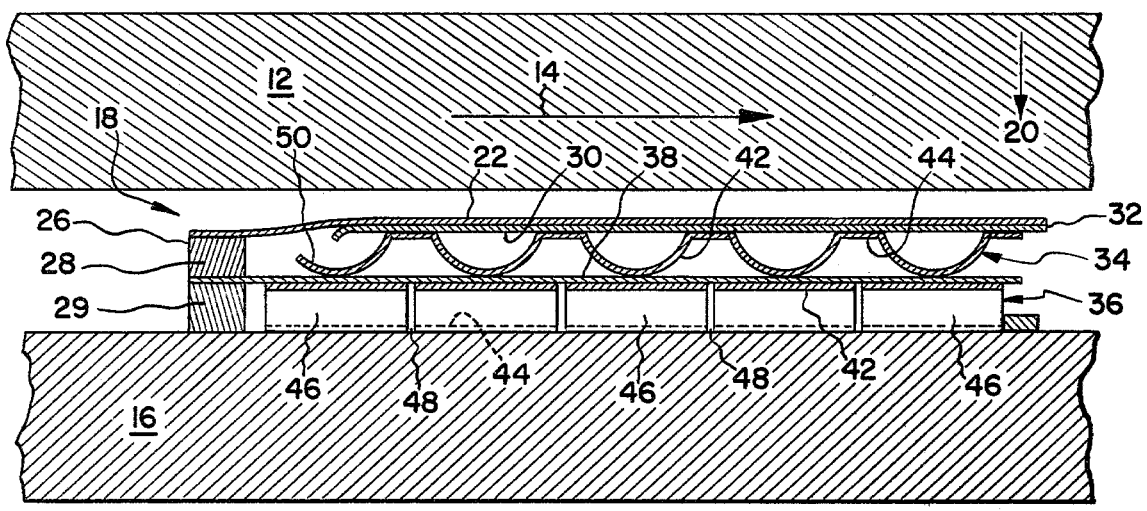
FIG. 3 is a sectional elevation of the assembled bearing pad shown in FIG. 2.
Figure 4:
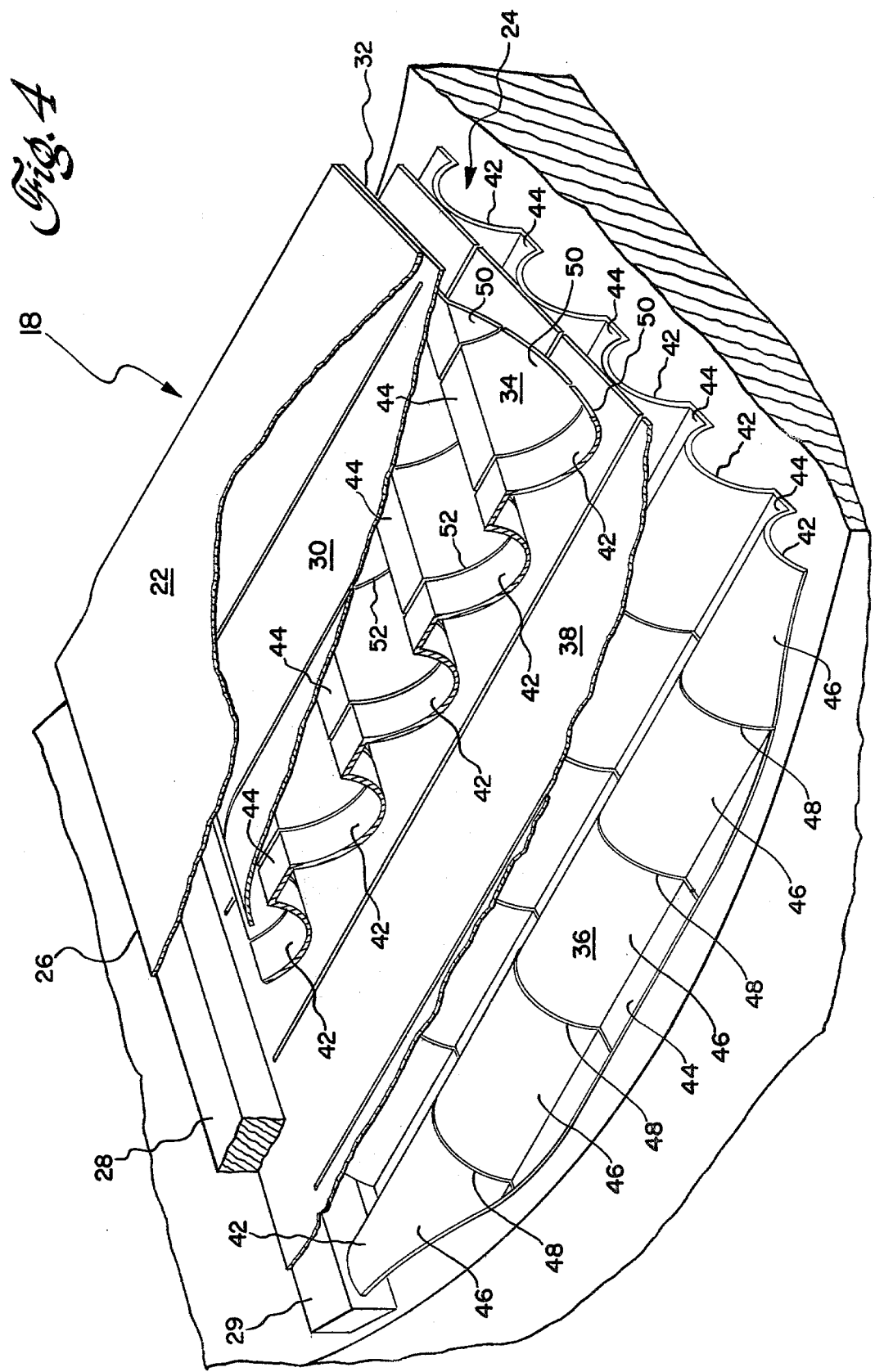
FIG. 4 is a partial sectional perspective view of the bearing pad shown in FIG. 3.

Turning now to FIG. 2, the support element 24 includes three separate foil modules arranged in series. This series arrangement is an extension of the concept embodied in the co-pending U.S. Application Ser. No. 974,255 of Gray, et. al. entitled "Compliant Hydrodynamic Bearing with Improved Support Element" filed on Dec. 29, 1978, now U.S. Pat. No. 4,208,076 the disclosure of which is incorporated herein by reference. The purpose of arranging the springs provided by the foil modules in series is to enable the foil modules to be fabricated from a stronger material having a greater modulus of elasticity so that the stress capacity of the support element can be greatly increased without increasing the total stiffness of the support element.

The support element 24 includes a top foil support module 34, a bottom foil support module 36, and an intervening mid-plane sheet 38. The bottom foil support module 36 is secured along its inner radial edge 40 by, for example, spot welding to the thrust plate 16. The intervening mid-plane sheet 38 is secured at its leading edge to the bottom spacer block 29, and the top foil support module 34 is fastened at its leading edge to the top spacer block 28 so that the sheet 38 and the top module 34 are secured indirectly to the thrust plate 16 at an elevation sufficient to clear the bottom module 36.

Both top and bottom foil modules 34 and 36 are formed as corrugated or bump form spring units. The bumps are formed with a radius of curvature approximately 0.0725 inches and with a pitch of approximately 0.124 inches. The bumps 42 are separated by narrow flat land portions 0.024 inches wide. The bump and land dimensions are uniform on both top and bottom sheets and across the entire area of both sheets.

The mid-plane sheet 38 is very thin and functions to prevent interference between the top and bottom foil support modules 34 and 36, and spread the force exerted between corresponding bumps to prevent an excessive concentration of stress at the point where one crest crosses the crest of the opposing bump. The sheet 38 is sufficiently thin to contribute little angular stiffness to the support element.

Each of the top and bottom foil support modules 34 and 36 are slit along lines generally transverse to the axis of the corrugations. The bottom support foil module 36 is divided into five radially extending strips 46 along radially extending slits 48 although more or fewer strips can be used. The top foil support module 34 is divided into five circumferentially extending strips 50 by splits 52 extending from adjacent the leading edge 26. The slits 48 and 52 do not reach all the way to the edge but terminate short thereof so that the strips 46 and 50 of the bottom and top foil support modules 36 and 34 remain connected together as unitary modules. A stop such as a narrow, radially extending foil strip welded to the thrust plate adjacent the trailing edge 32 of the pad may be employed to prevent the trailing strip 46 from spreading angularly away from the other strips 46. I have not found this to be necessary, but it may be a prudent precaution to relieve stress at the radially inner connection of the trailing strip 46 with the module 36.

The intervening mid-plane sheet 38 can be divided into a plurality of circumferentially extending strips by slits (not shown) which lie vertically between the slits 52 on the top foil support module 34. This will eliminate whatever slight angular stiffness the sheet 38 might contribute to the bearing module in the radial direction while continuing its force distribution and interference-preventing functions. The center line of the strips of the sheet 38 would be arranged to lie directly over and parallel to the crest of the bumps on the bottom foil support module 36 and parallel to and vertically aligned with the slits 52 in the top foil support module 34.

To provide uniformity of angular stiffness about orthogonal axes across the bearing pad, the axes of the corrugations on the two modules are crossed. The axis of the corrugations on the bottom foil support module 36 extends parallel to the direction 14 of the rotor rotation, and the axis of the corrugations on the top sheet runs perpendicular to the rotor rotation direction 14. The orientation of the corrugations axes on the two foil modules need not be exactly perpendicular, however, and could be arranged at as small an angle as 45°. It is the crossed or angular orientation of the corrugation axes that the term "cross-plies" is intended to denote.

The angle which the corrugation axes on the two sheets make with each other is selected to yield the stiffness and support distribution best suited for the application involved. For example, a 45° angle orientation of the corrugation axes can be made to produce a higher stiffness at the outside trailing corner of the pad by orienting the roll axes represented by the corrugation axes away from the outside trailing corner and more toward the inside trailing corner and the outside leading corner. Likewise, the inside leading corner would be stiffer also.

The foil support modules, shown herein oriented crest-to-crest, may also be oriented land-to-land. In this orientation, the crests of the corrugations on the bottom and top foil support modules 36 and 34 lie against the thrust plate 16 and against the bearing sheet 22, respectively, and the lands 44 lie facing each other through the mid-plane sheet 38. This orientation distributes the force somewhat more evenly because the entire crest of each corrugation on each module strip is in line contact with a supporting or supported surface, and the lands of each module strip are in four-zone contact with the lands on the strips of the other module, through the sheet 38.

Another design flexibility provided by this invention is the possibility of using foil support modules of different stiffness. For example, the lower foil support module 36 can be made softer than the top support foil module 34 which will produce an angular stiffness of the pad which is softer in the radial direction than in the angular direction. The reason for this effect is that the angular stiffness of the foil support modules is softest about axes parallel to their corrugation axes, even with the slits, so that an increase in the angular compliance of the bottom foil support module 36 will increase the angular compliance about the axis parallel to the direction 14 of rotor rotation than about the orthogonal axis in the place of the bearing sheet. Thus, the combined angular compliance of the two support foil modules 34 and 36 will be greater in the radial than in the angular direction.

The improved uniformity of compliance and the resulting improvement of conformance of the bearing sheet to the surface of the rotor contribute greatly to the bearing's manufacturing reliability. Each finite zone across the surface of the support element can deflect independently, and its angular stiffness and vertical stiffness can be designed to optimally meet the requirements of the application. The bearing is thus capable of deflecting locally under local loading conditions so that the bearing clearance and heat generation remains uniform. The slight wear on the bearing sheet during start-up and slow-down is distributed evenly despite misalignment and eccentric loading, and these conditions are also tolerated better during high-speed operation because of the uniformity of angular and vertical compliance.

The independence and uniformity of compliance of each finite area of each bearing pad also contributes to the uniformity of load distribution between the pads. Because each pad can conform to the runner bearing surface, it enables a pad, which under some abnormal loading conditions would otherwise have to carry the entire axial load, to deflect without damage sufficiently to let the other pads take up their share of the load.

Figure 5:
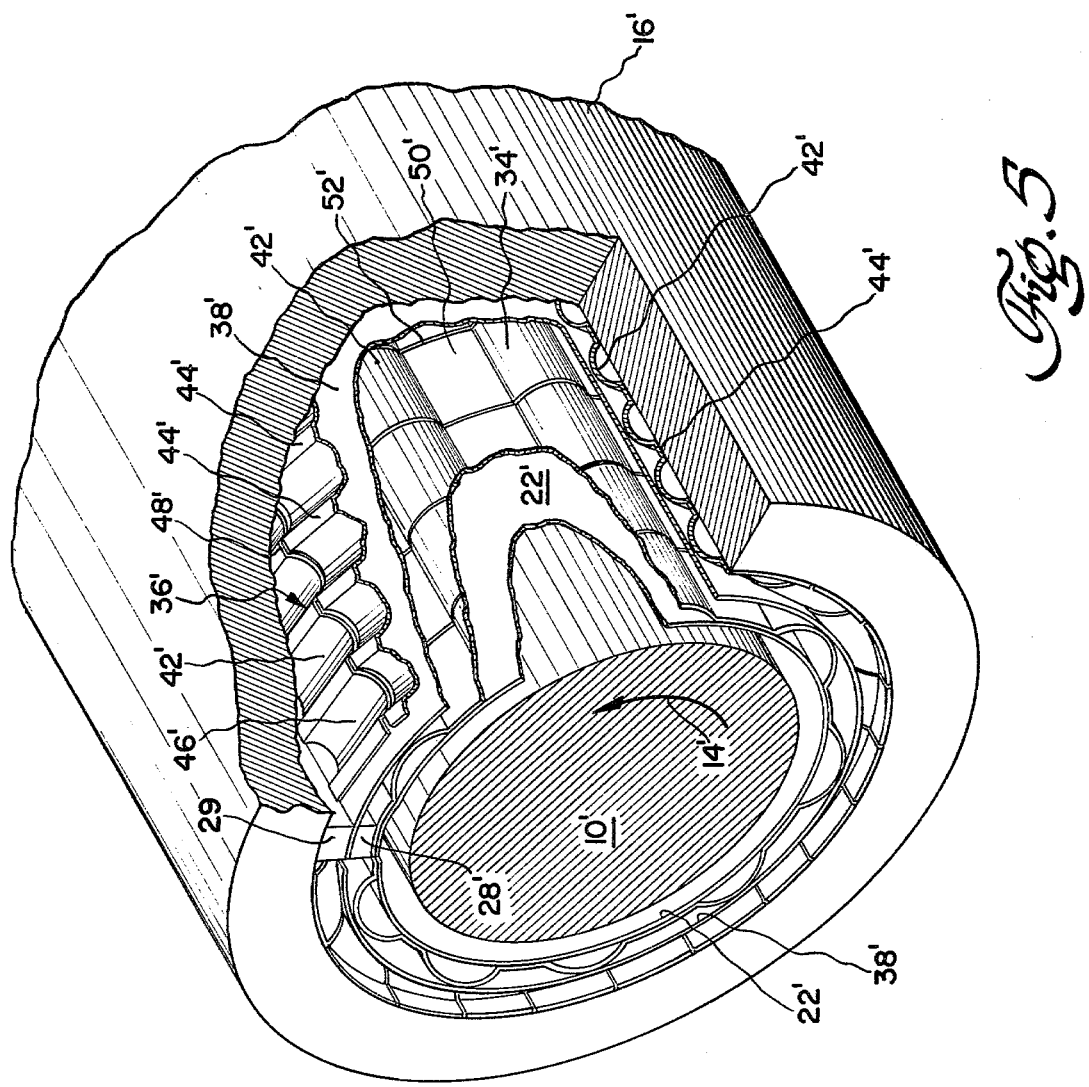
FIG. 5 is a partial perspective view of a journal bearing made in accordance with this invention.
Figure 6:
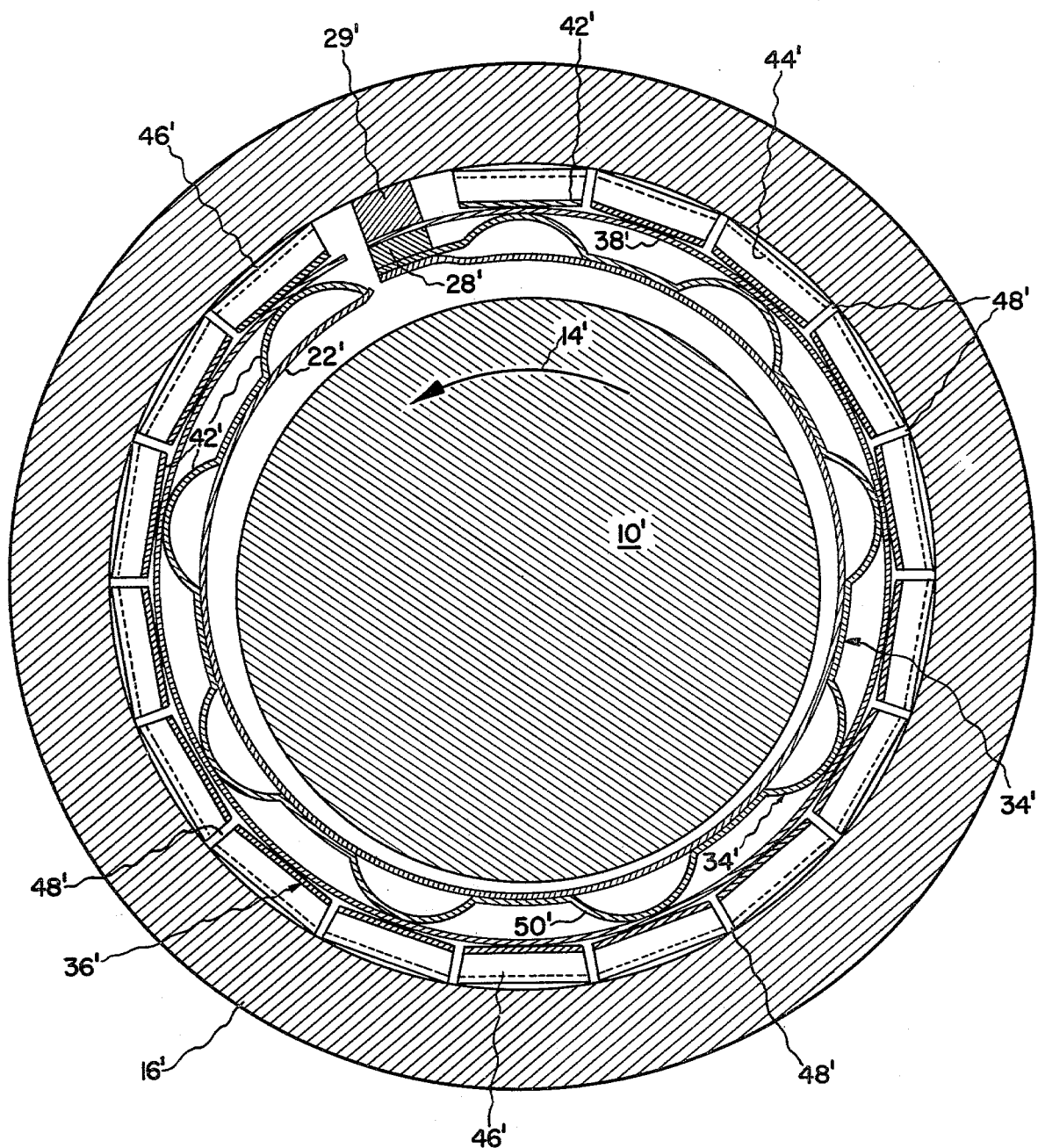
FIG. 6 is a cross-sectional elevation of the bearing shown in FIG. 5.
Figure 7:
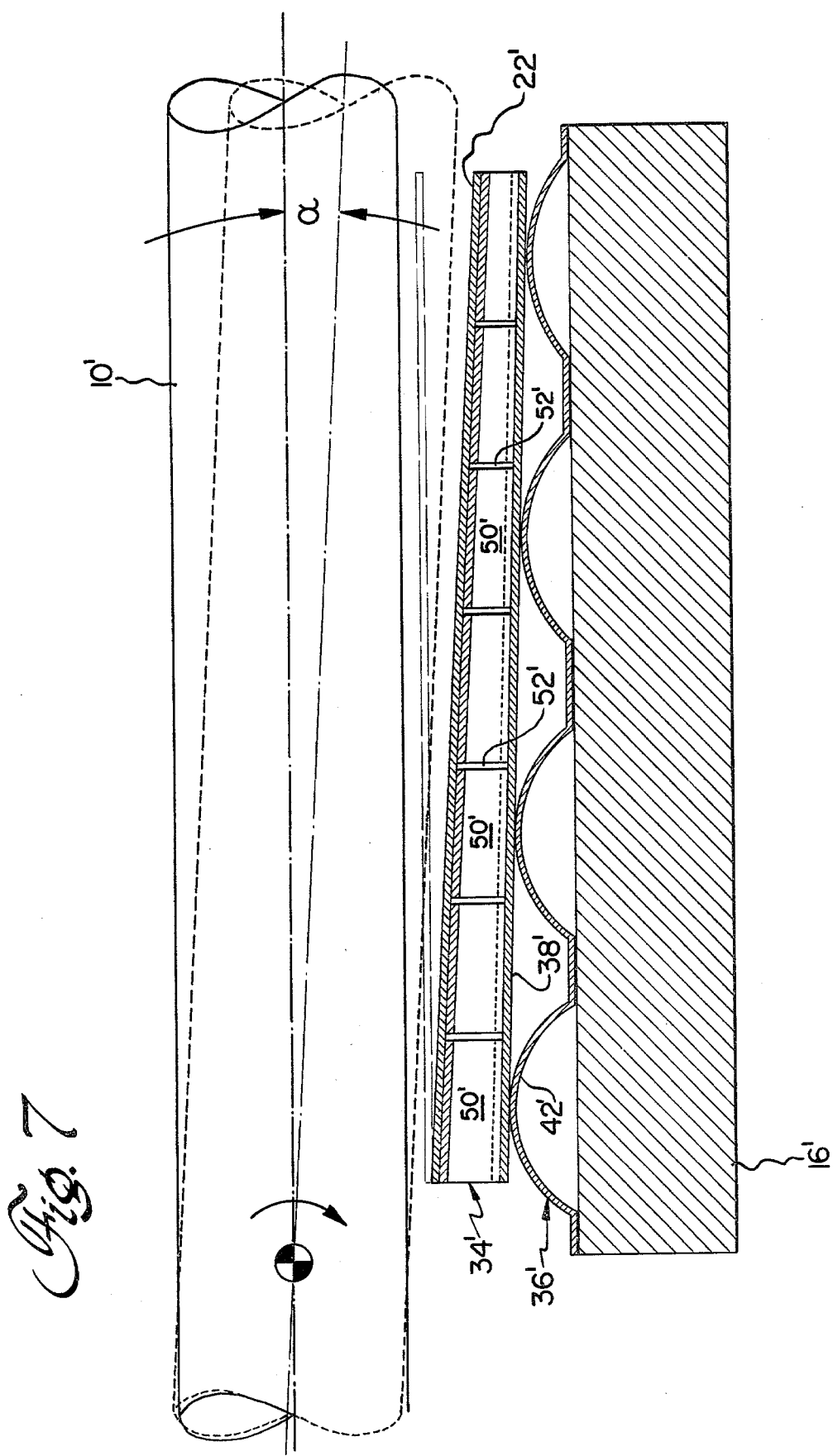
FIG. 7 is a partial cross-sectional elevation, on a plane parallel to the shaft axis, showing a misalignment condition.

Turning now to FIGS. 5-7, a journal bearing made in accordance with this invention is shown having a stationary journal bearing sleeve 16' supporting a bearing assembly which in turn dynamically supports a rotating shaft 10'. The bearing assembly includes a flexible bearing sheet 22' supported by a support element 24' which is formed of three resilient foil support modules including a top corrugated foil support module 34', a bottom corrugated support module 36', and an intervening smooth mid-plane sheet 38'. The corrugations on the bottom foil support module 36' run circumferentially and the foil support module is divided into a plurality of axially extending strips 46' formed by axially extending slits 48'. Since the foil support module is angularly stiff in the direction parallel to the corrugations, the plurality of axially extending strips 46' tend to form a polygonal lobe bearing surface which has the desirable property of inhibiting unstable fluid phenomenon in the bearing and can be arranged to provide a bearing pre-load and maintain the proper bearing clearance over a wide range of operating speeds. In addition, the bottom foil support module is angularly soft from end to end of the bearing sleeve, so it deflects readily under misalignment load as shown in FIG. 7 to spread the bearing load evenly over the entire axial length of the bearing and thereby prevent excessive localized load at one end of the bearing sleeve.

The top foil support module 34 is likewise corrugated, but the corrugations in the top module 34' run in the axial direction to provide good angular compliance circumferentially.

The top foil support module 34' is split into a plurality of circumferentially extending strips 50' along circumferentially extending slits 52'. This provides a degree of axial compliance which permits effective utilization of the axial compliance of the bottom foil support module 36'. The mid-plane sheet 38' prevents interference between the two foil support modules 36 and 34 and spreads the force exerted by the top foil support module 34' to the bottom foil support module 36'. The mid-plane sheet 38' can be split into a plurality of circumferentially extending strips by a plurality of axially spaced slits in the same manner as that discussed for the thrust bearing shown in FIGS. 1 through 4, and for the same purpose.

Figure 8:
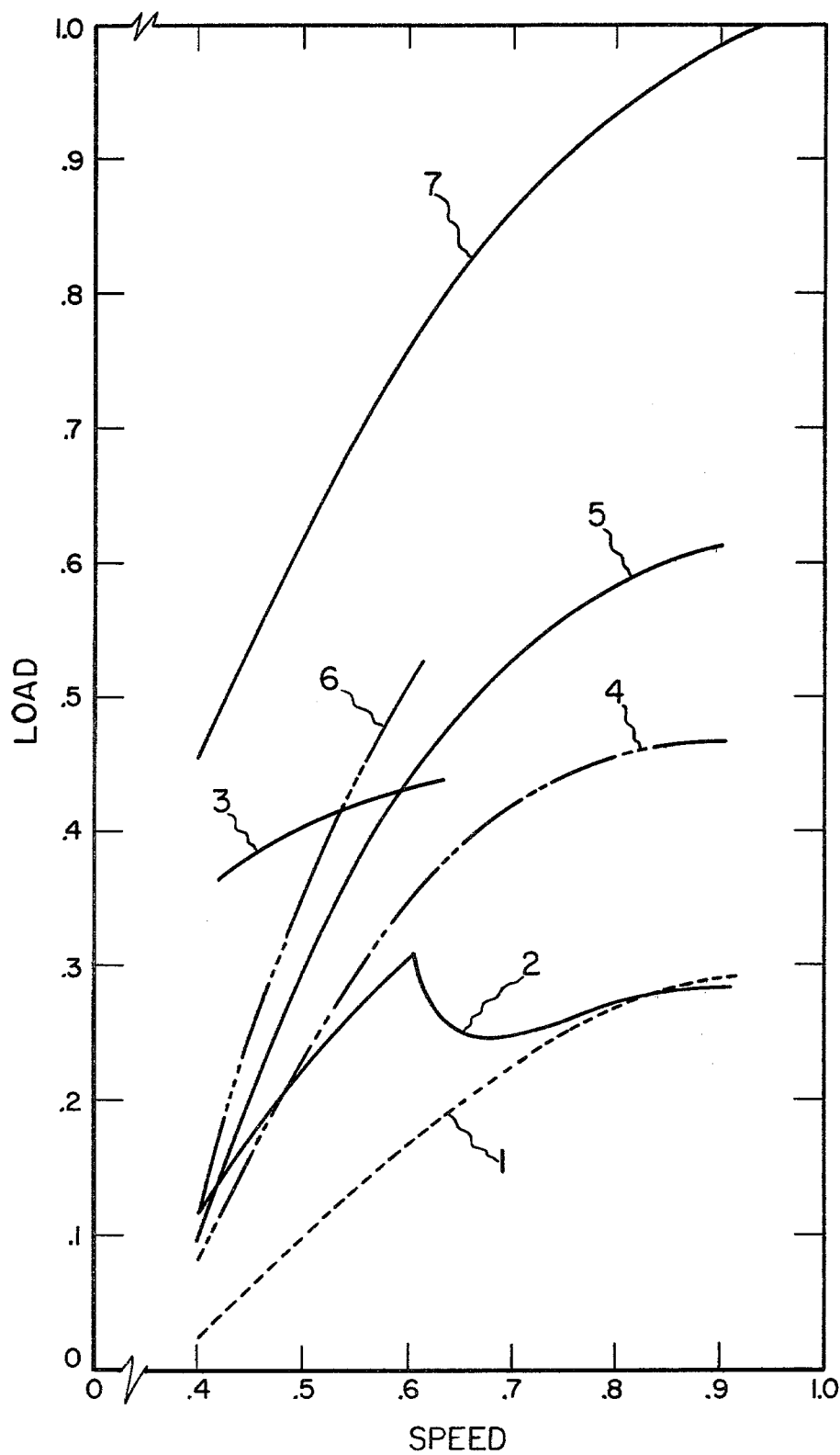
FIG. 8 is a graph showing load carrying capacity versus rotor speed for various forms of compliant bearings.

As shown in FIG. 8, the load capacity, as a function of rotor speed, is shown for a series of different compliant hydrodynamic fluid film bearings. Curve 1 shows the characteristics of a single corrugated foil support member supporting a smooth bearing sheet. Curve 2 shows a similar bearing having a thicker bearing sheet. The foil support module is more compliant and shows a greater load capacity at lower speed but a loss of load capacity at a certain maximum which indicates that the stress capacity of the support element had been exceeded. Curve 3 is the characteristic of a bearing having a foil support module which is much softer than the foil support module of Curve 2 and with a thinner bearing sheet. The bearing of curve 3 exhibits an even higher load carrying capacity at low speed but, like the bearing of curve 2, loses its load capacity at a relatively low speed.

The bearing of curve 4 is similar to the bearing of curve 1 but the foil support module has been slit in the manner taught in my earlier co-pending application Ser. No. 974,256 entitled "Compliant Hydrodynamic Thrust Bearing" filed on Dec. 29, 1978, the disclosure of which is incorporated herein by reference. The greater load carrying capacity of this bearing is believed to be a result of the invention taught in the last mentioned co-pending application.

The bearing, whose characteristic is shown on curve 5, is disclosed in my aforementioned co-pending application Ser. No. 80,503. The improved load carrying capacity at higher speeds is believed to be the result of the improved strength and load distribution capabilities of the disclosed structure.

The bearing represented by curve 6 is the bearing disclosed herein. It exhibits a higher load carrying capacity at low speeds because of the improved compliance of the foil support modules which act as springs in series and therefore provide improved compliance without decreasing the stress capacity of the foil modules. The higher load capacity of this bearing at high speeds is believed to be a result of the improved stress capacity of the bearing elements and also the ability of the cross-ply strips to roll about transverse axes and thereby provide angular compliance about both circumferential and axial axes. The bearing is thus capable of providing compliance at a low rotor speed and early generation of a high-pressure load carrying hydrodynamic fluid film over the bearing sheet. In addition, the transient shock, misalignment, and unbalanced loading of the rotor can be tolerated by the bearing which can be made approximately equally compliant in all directions across the bearing surface. The deflection of the support element is thus more closely matched to the load on the bearing sheet directly above it. This makes possible a more uniform clearance between the rotor surface and the bearing sheet surface and prevents unequal generation of heat at localized areas on the bearing surface which can cause localized distortion of the bearing sheet to an extent sufficient to bridge the fluid film, which is quite thin at high-load, high-speed conditions, and cause sudden damage or destruction to the bearing.

The bearing shown in curve 7 has not actually been constructed but is a bearing characteristic that I believe can be approached by a hypothetical combination of the bearing disclosed herein and the bearing disclosed in my aforementioned concurrently filed application entitled "Multi-Stage Support Element for Compliant Hydrodynamic Bearings." The staged parallel support element shown in the last mentioned application can be made with the materials disclosed in my co-pending application Ser. No. 80,504 filed on Oct. 1, 1979 and entitled "Composite Material Compliant Bearing Element" and substituted for each of top and bottom foil support modules to give a complex series parallel spring array which I believe can be adjusted to provide a load carrying characteristic approaching that shown in Curve 7.

Obviously, numerous modifications and variations of the disclosed embodiments are possible in view of the disclosure and the suggested and implied modifications thereto included as part of this disclosure.

Thus, it is to be expressly understood that these modifications and the equivalents thereof may be made and used while remaining within the spirit and scope of the invention, which is defined in the following claims, wherein I claim:

1. A compliant hydrodynamic fluid film bearing, comprising:
   first and second relatively movable members having opposing surfaces defining therebetween a gap;
   a bearing sheet attached to one of said members and having a bearing surface facing said surface of the other of said members;
   a support element lying between said bearing sheet and said one member, and supporting said bearing sheet on said one member;
   said support element including a first corrugated foil module lying on said one member and formed as a plurality of strips whose length runs generally perpendicular to the axis of said corrugations;
   a second corrugated foil module lying between said bearing sheet and said first corrugated foil module, formed as a plurality of strips whose length runs generally perpendicular to the axis of its corrugations and to the strips of said first corrugated foil module;
   said support element thereby forming a matrix of substantially independently compliant support zones including a plurality of zones in orthogonal directions distributed across the area of said support element, each zone of said support element having an angular compliance that is substantially equal about orthogonal axes directions in the plane of said bearing sheet.

2. The bearing defined in claim 1, wherein:
   said first and said second corrugated foil modules are in the form of elongated bumps spaced apart by flat land portions; and
   said corrugated foil modules are oriented, with respect to each other, with their bump portions facing each other, crest-to-crest, and their land portions spaced apart and contacting said one member and said bearing sheet, respectively.

3. The bearing defined in claim 1, wherein said support element further includes an intervening sheet lying between said first and second corrugated foil modules for distributing the load from one foil module to the other and for preventing interference between the edges of the strips on adjacent bumps on the two foil modules.

4. The bearing defined in claim 1, wherein said bearing is a journal bearing, said one member is a journal sleeve and said other member is a shaft; said first corrugated foil module lying with the axis of the corrugations thereof extending perpendicular to said shaft axis to form thereby a polygonal lobe bearing.

5. The bearing defined in claim 4, wherein
   said first and said second corrugated foil modules are in the form of elongated bumps spaced apart by flat land portions; and
   said corrugated foil modules are oriented, with respect to each other, with their bump portions facing each other, crest-to-crest, and their land portions spaced apart and contacting said one member and said bearing sheet, respectively.

6. The bearing defined in claim 5, wherein said support element further includes an intervening sheet lying between said first and second corrugated foil modules for distributing the load from one foil module to the other and for preventing interference between the edges of the strips on adjacent bumps on the two foil modules.

7. The bearing defined in claim 1, further comprising stiffener sheets second to the trailing edge of said bearing in the direction of rotation of said other member relative to said first member, and lying between said bearing sheet and said second corrugated foil module to stiffen the trailing edge of said bearing sheet to better support the load under high-speed conditions and distribute said load to the adjacent, less loaded portions of said support element.

8. The bearing defined in claim 7, wherein said stiffener sheet is slit into parallel strips, and said strips run parallel to said strips of said second support element.

9. The bearing defined in claim 8, wherein said stiffener sheet is fastened to the trailing edge of said bearing sheet, and said stiffener sheet strips run parallel to the direction of relative motion of said other member.

10. The bearing defined in claim 1, wherein said orthogonal directions are parallel to the direction of rotation of said other member and perpendicular thereto in a plane parallel to the surface of said other member.

* * * * *